United States Patent
Shin et al.

(10) Patent No.: US 7,460,532 B2
(45) Date of Patent: Dec. 2, 2008

(54) METHOD OF PROVIDING ROUTING PROTOCOL IN SENSOR NETWORK

(75) Inventors: Changmin Shin, Daejeon (KR); Seung Min Park, Daejeon (KR); Jae Hyuk Ryu, Daejeon (KR); Yong Jin Lim, Daejeon (KR); Dae Young Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 887 days.

(21) Appl. No.: 10/951,987

(22) Filed: Sep. 27, 2004

(65) Prior Publication Data

US 2005/0135360 A1 Jun. 23, 2005

(30) Foreign Application Priority Data

Dec. 19, 2003 (KR) .................. 10-2003-0094034

(51) Int. Cl.
*H04L 12/28* (2006.01)
(52) U.S. Cl. .................. 370/389; 370/238; 370/338; 370/355; 370/356; 370/354; 370/401; 370/252
(58) Field of Classification Search ................ 370/389, 370/238, 338, 392, 354–356, 400–401, 252
See application file for complete search history.

(56) References Cited

U.S. PATENT DOCUMENTS 6,512,935 B1 1/2003 Redi

2003/0063585 A1 4/2003 Younis et al.
2005/0073992 A1* 4/2005 Lee et al. ................... 370/351
2005/0111428 A1* 5/2005 Orlik et al. ................. 370/344
2005/0135379 A1* 6/2005 Callaway et al. ....... 370/395.31

OTHER PUBLICATIONS

"A Fully Distributed Routing Algorithm for Maximizing Lifetime of a Wireless Ad Hoc Network", W. Cho, et al., 2002 IEEE, pp. 670-674.

* cited by examiner

*Primary Examiner*—Steven H Nguyen
*Assistant Examiner*—Kibrom T Hailu
(74) *Attorney, Agent, or Firm*—Blakely, Sokoloff, Taylor & Zafman LLP

(57) ABSTRACT

A method of providing a routing protocol in a sensor network includes the steps of: initializing a routing table and searching a network device of a node to initialize a host; opening a socket when there is a request for forwarding of an IP (Internet Protocol) packet from an upper layer or when there is a request through the network device; determining whether there is the IP packet forwarding request of the upper layer node or whether the packet is received from the network device; if there is the IP packet forwarding request of the upper layer, searching the routing table, and determining whether or not there is a destination node which intends to transmit the packet, and returning to a main loop if there is the destination node; and if the packet is received through the network device, determining types of the received packets and performing RREQ (route request) process, IDLE process, RREP (route reply) process, RERR (route error) process, and RREP_ACK (route reply acknowledgement) process.

7 Claims, 5 Drawing Sheets

METHOD OF PROVIDING ROUTING PROTOCOL IN SENSOR NETWORK

BACKGROUND OF THE INVENTION

1. Field of the Invention

The present invention relates to a method of providing a routing protocol in a sensor network, and more particularly, to a method of providing a routing protocol in a sensor network, in which lifetime of sensors can be considered to the maximum by using the routing protocol considering to an energy efficiency in the sensor network, and energy can be regularly used at all sensor nodes to long maintain a lifetime of an entire network.

2. Description of the Related Art

A technical field of the present invention is a routing protocol that is a kernel of a sensor network. The sensor network has a self-computation capability and it is comprised of a plurality of nodes having the sensors, which can communicate with other nodes.

Each of the nodes constructing the sensor network can collect information, such as temperature, air pressure, humidity and the like by using the sensor installed at the nodes and it can self-analyze information, which is obtained from the sensor, through the self-computation capability.

Further, several nodes of the sensor network can collect the analyzed result as well as the unprocessed result obtained from the sensor, through a communication of each of the sensor nodes. Additionally, each of the nodes can collect information in a fixed position and also have a mobility depending on a rapid change of environment.

Accordingly, the sensor network requires a sensor and communication equipment for collecting data and communicating with other nodes, the routing protocol for assisting the communication with the sensor node, and the appliance for analyzing information obtained from the sensor.

Since the sensor network has so many similarities with an Ad Hoc network, which performs a mobility management and a peer-to-peer communication, a routing protocol technology for the mobility management and the data transmission path of the sensor network succeeds the Ad Hoc network.

The routing protocol of the Ad Hoc network is mainly classified into a proactive routing protocol and a reactive routing protocol. In the proactive routing protocol, a routing information is updated according to a periodical message transmission and reception between nodes, thereby providing the routing information of all nodes. In the reactive routing protocol, the routing information of up to the destination node is provided according to the request at the data transmission. The above two methods have their advantages and disadvantages.

Since an origin node always has the routing information of the destination node in the proactive routing protocol, a fast data transmission can be achieved according to the routing information at the data transmission.

However, since many nodes should always maintain the routing information in the proactive routing protocol, the nodes require many memories and much load are burdened on the nodes according to the message transmission between the nodes so as to always maintain the latest information.

On the contrary, the reactive routing protocol requires the routing information only at the data transmission, so that a little delay may occur at an initial time of data transmission. However, much load is not burdened on each node. If considering the limits to the sensor network in two routing ways, the reactive routing protocol is judged to be more suitable in view of the load burdened on the sensor node.

The proactive routing protocol includes Destination-Sequenced Distance Vector (DSDV), Cluster-Gateway Switching Router (CGSR), Wireless Routing Protocol (WRP) and the like, and the reactive routing protocol includes Ad Hoc On-Demand Distance Vector (AODV), Dynamic Source Routing (DSR), Associativity-Based Routing (ABR) and the like.

The sensor network of the present invention has different characteristics from 802.11 wireless LAN for interfacing with a given network through an access point and from the Ad Hoc network for performing a peer-to-peer communication between nodes independently of a given infrastructure.

Each of the sensor nodes must be comprised of minimal simplified elements. Accordingly, it should have a limited power and storage unit and a simple communication capability of not burdening much load on the node. Further, since the sensor nodes have the frequent variation of topology depending on an environmental influence, the sensor nodes require a fast reconstruction of the topology.

SUMMARY OF THE INVENTION

Accordingly, the present invention is directed to a method of providing a routing protocol in a sensor network, which substantially obviates one or more problems due to limitations and disadvantages of the related art.

It is an object of the present invention to maximize an efficiency of energy in a sensor network considering lifetimes of sensors to the maximum, and allow energy of entire sensor nodes to be regularly used, thereby maintaining long lifetime of an entire sensor network. Unlike a personal computer to which power is continuously supplied and a terminal which performs a continuous operation through a battery replacement, a sensor node cannot be recharged. Therefore, an effective management of energy is required. Lifetime of the sensor node and the sensor network depend on a lifetime of a battery. In the present invention, a routing algorithm is developed to provide a method of providing the routing protocol in the sensor network in which the energy efficiency is maximized in the sensor network.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method of providing a routing protocol in a sensor network, the method comprising the steps of: initializing a routing table and searching a network device of a node to initialize a host; opening a socket when there is a request for forwarding of an IP (Internet Protocol) packet from an upper layer or when there is a request through the network device; determining whether there is the IP packet forwarding request of the upper layer node or whether the packet is received from the network device; if there is the IP packet forwarding request of the upper layer, searching the routing table, and determining whether or not there is a destination node which intends to transmit the packet, and returning to a main loop if there is the destination node; and if the packet is received through the network device, determining types of the received packets and performing RREQ process, IDLE process, RREP process, RERR process, and RREP_ACK process.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
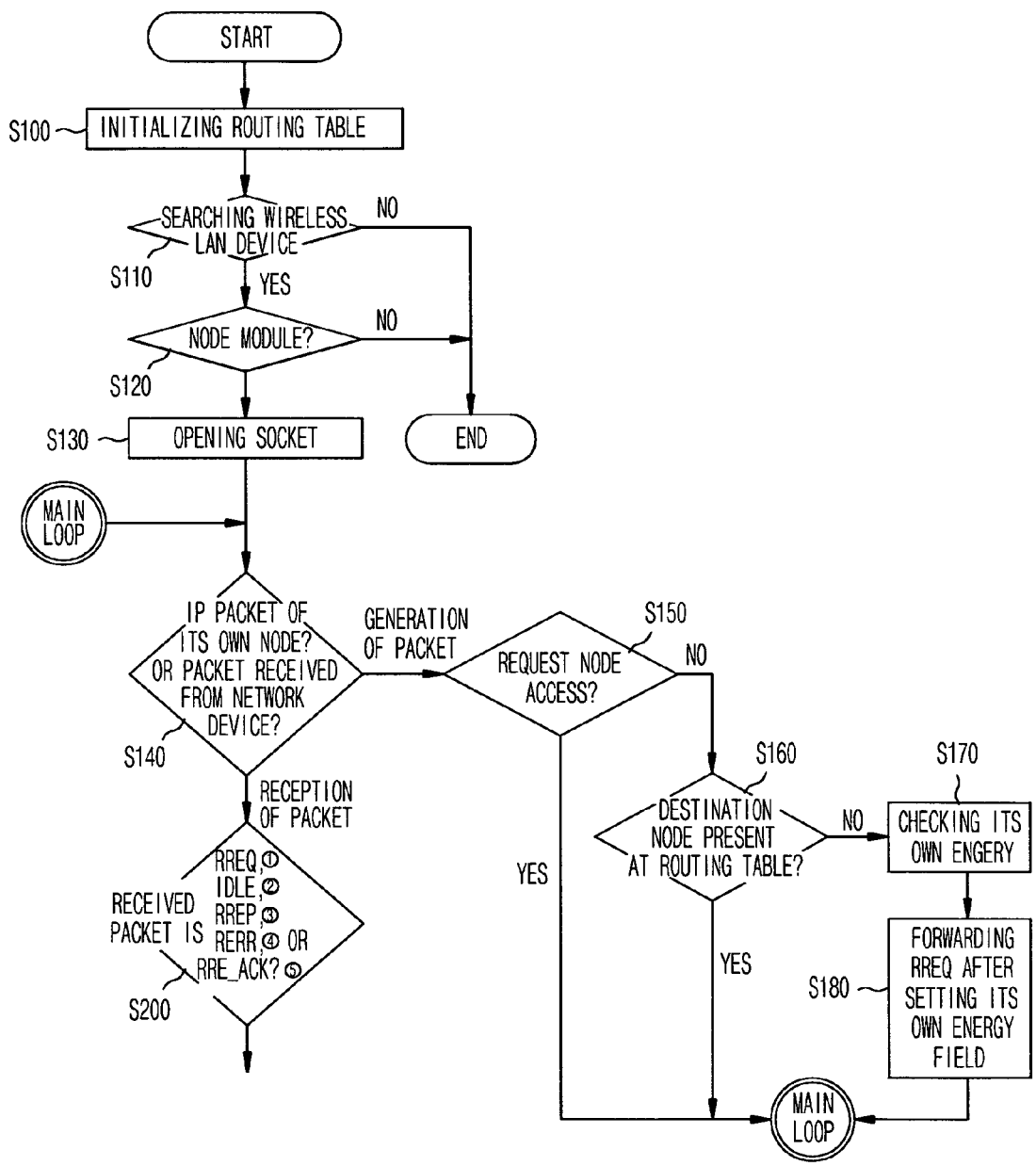
FIG. 1 is a flowchart illustrating a method of providing a protocol according to the present invention.

FIG. 1 is a flowchart illustrating an algorithm of providing a protocol according to the present invention. If the algorithm starts, messages to be processed are checked and loops are repeated. When an IP-layer traffic requests a forwarding or a message is received from a neighbor node, the inventive algorithm processes the message according to environments.

First, a routing table is initialized (S100), and a network wireless LAN device of a node is searched to initialize a host (S110).

When there is a forwarding request of IP packet from an upper layer or when there is a request through the network device, a socket is opened (S130). Then, it is judged whether the IP packet transmission of the upper layer node is requested or the packet is received from the network device (S140).

When there is the request from the upper layer, the routing table of its own node is searched (S150). It is judged whether or not the routing table has a destination node which intends to forward the packet (S160). If there is the destination node, the algorithm returns to a main routine.

If there is no destination node, an RREQ packet is forwarded. At this time, a reserved field of the RREQ packet is used. An amount of energy of a current node is added to the reserved field (S180).

Meanwhile, when the packet is received through the network device, the types of the received message is determined and then the algorithm performs RREQ process, IDLE process, RREP process, RERR process, and RREP_ACK process (S200).

Figure 2:
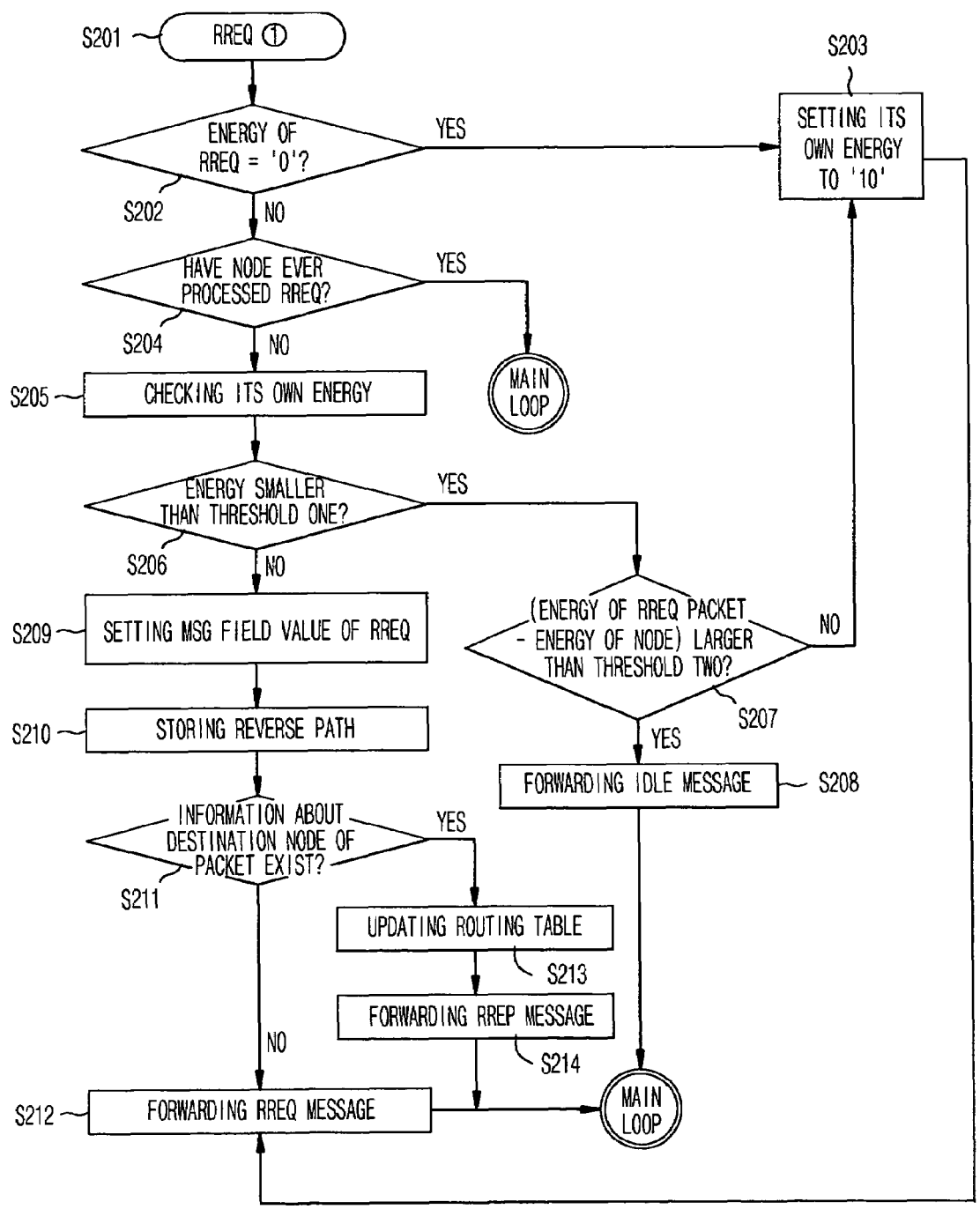
FIG. 2 is a view illustrating an operation of processing an RREQ message according to the present invention.

FIG. 2 is a view illustrating an operation of processing an RREQ message according to the present invention.

A value of energy field is extracted from the received RREQ message and it is determined whether the value of energy field is '0' or not (S202).

That the value of energy is '0' means that the sensor network releases an IDLE mode of its own node as a response to the IDLE message and performs the packet forwarding.

Accordingly, if the value of energy is '0', the forward RREQ packet is set to '10', which is a maximum amount of energy, instead of the amount of energy of its own node and it is then transmitted (S203). At this time, the energy field is modified to the maximum energy so as to consider the energy at the next nodes.

If the packet is forwarded with a small energy among the energies of previous nodes, instead of the maximum energy, the packet is hereafter continuously forwarded even with small energy.

On the contrary, if the energy field has non-zero value, it is an ideal RREQ packet forwarding. It is determined whether or not a current node has ever processed the packet having a current RREQ_ID (S204). If so, the algorithm ignores it and returns.

If the current node has never processed the packet having the RREQ_ID, an amount of energy at the current node is measured (S205) and it is compared with a "threshold one" value (S206).

If the amount of energy at the node is smaller than the threshold one value, there is a probability that it can be the IDLE mode. It is determined whether or not an energy field difference (received_energy—node_energy) between the energy of the current node and the RREQ packet is larger than a "threshold two" value (S207). If smaller, the energy field of the RREQ packet to be forwarded is modified to the maximum amount of energy, that is, '10' (S203), and the RREQ is forwarded (S212).

That the difference (received_energy—node_energy) is smaller than the threshold two means that the current node is not in the IDLE mode and the energy of the neighboring nodes is considered to join in the RREQ packet transmission. A large difference between the two values means that the energy of the current node is small compared with the neighboring nodes. Therefore, it becomes the IDLE mode without joining in the RREQ packet transmission, and the IDLE packet is forwarded to the previous node (S208).

If the amount of energy at the node is larger than the threshold one value, the current node is in the ACTIVE state, not the IDLE state. Therefore, the RREQ packet is forwarded to next node in the same manner as the general RREQ packet forwarding.

After the amount of energy at the current node is compared with an energy field value of the received RREQ packet, the energy field is replaced with the small value (S209).

In the operation of forwarding the RREQ packet, a reverse path for forwarding the RREP packet is stored (S210). It is checked whether or not the information about the destination node of the packet is present at the current node (S211).

If the information is present at the current node, the RREP packet is forwarded using the reverse path (S214). If information is not present at the current node, the RREP packet is forwarded considering the amount of energy at the current node (S212).

Figure 3:
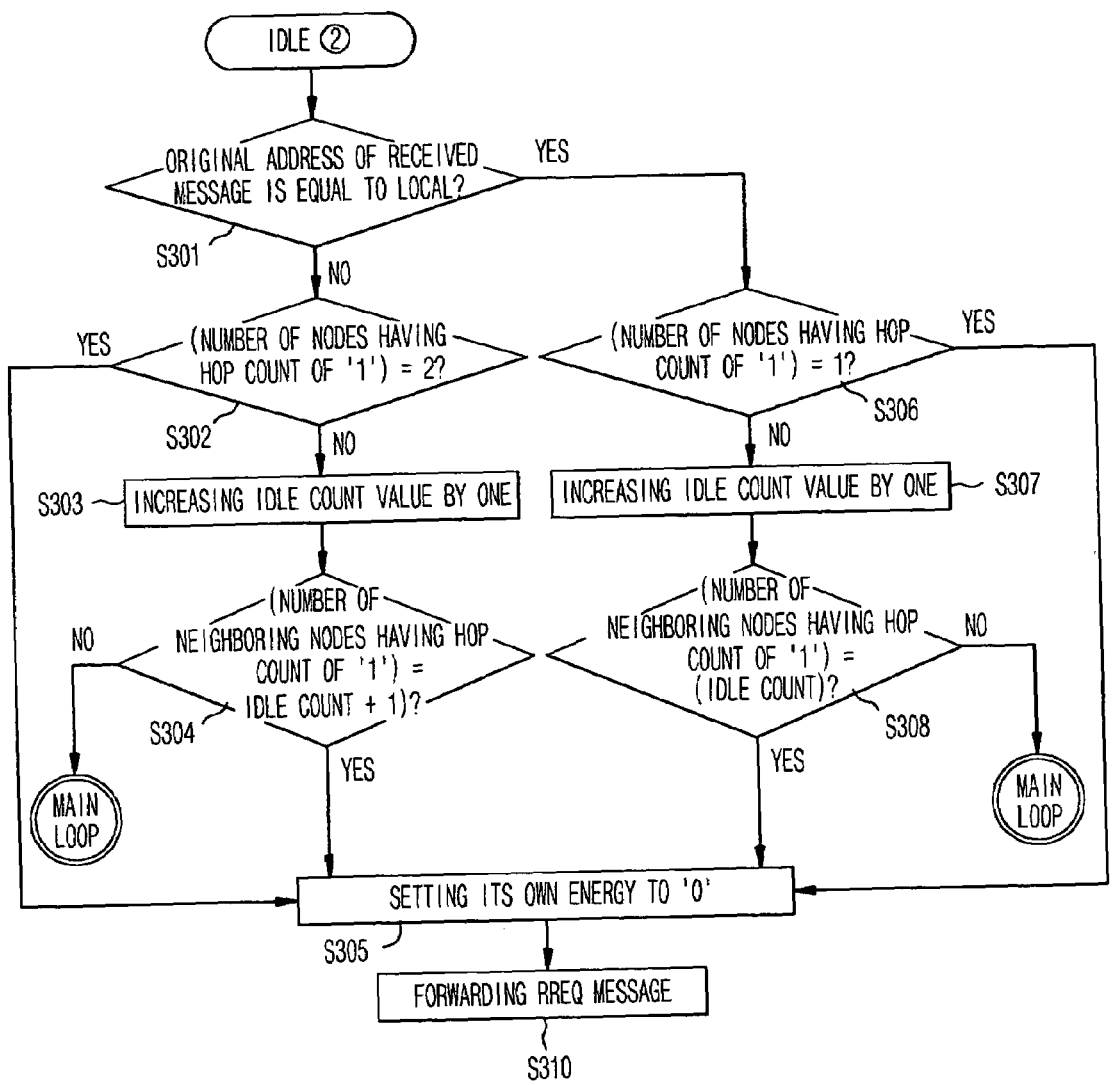
FIG. 3 is a view illustrating an operation of processing an IDLE message according to the present invention.

FIG. 3 is a view illustrating an operation of processing the IDLE message according to the present invention.

The IDLE packet is used to check states of the neighbor nodes. When the RREQ packet is received, it is determined whether or not the node is in the ACTIVE or IDLE mode, and then the IDLE packet is forwarded.

If the IDLE packet is received, it is judged whether or not the original address of the transmitted message is equal to the local (S301). This is because the process is different in the original node and intermediate node.

When the original address of the received message is an intermediate node different from the local, it is checked whether or not the number of the nodes whose hop count of the routing table is '1' is equal to two (S302). If equal, RREQ packet is forwarded to unicast of the node which sends the IDLE packet (S305). If not, the IDLE count value is increased by one (S303) to thereby update the number of the neighboring IDLE node.

Then, it is checked whether or not the number of the nodes having a hop count of '1' is equal to that of IDLE+1 (S304) If not equal, the algorithm returns to the main loop, and if equal, the energy is set to '0' (S305) and the process joins in the operation of forwarding the RREQ message (S310).

At this time, the energy field value of '0' is transmitted so as to clearly notify the ignorance of the IDLE mode if the RREQ packet is not an ordinary packet.

Then, when the received message is the original node, it is checked whether or not the number of the nodes having the hop count of '1' is equal to one (S306). If so, the RREQ packet is forwarded to unicast of the node which sends the IDLE packet (S305)

If not, the IDLE count value is increased by one (S307) to thereby update the number of the neighboring IDLE node.

Then, it is checked whether or not the number of the nodes having a hop count of '1' is equal to that of IDLE (S308). If not equal, the algorithm returns to the main loop, and if equal, the energy is set to '0' (S305) and the process joins in the operation of forwarding the RREQ message (S310).

Figure 4:
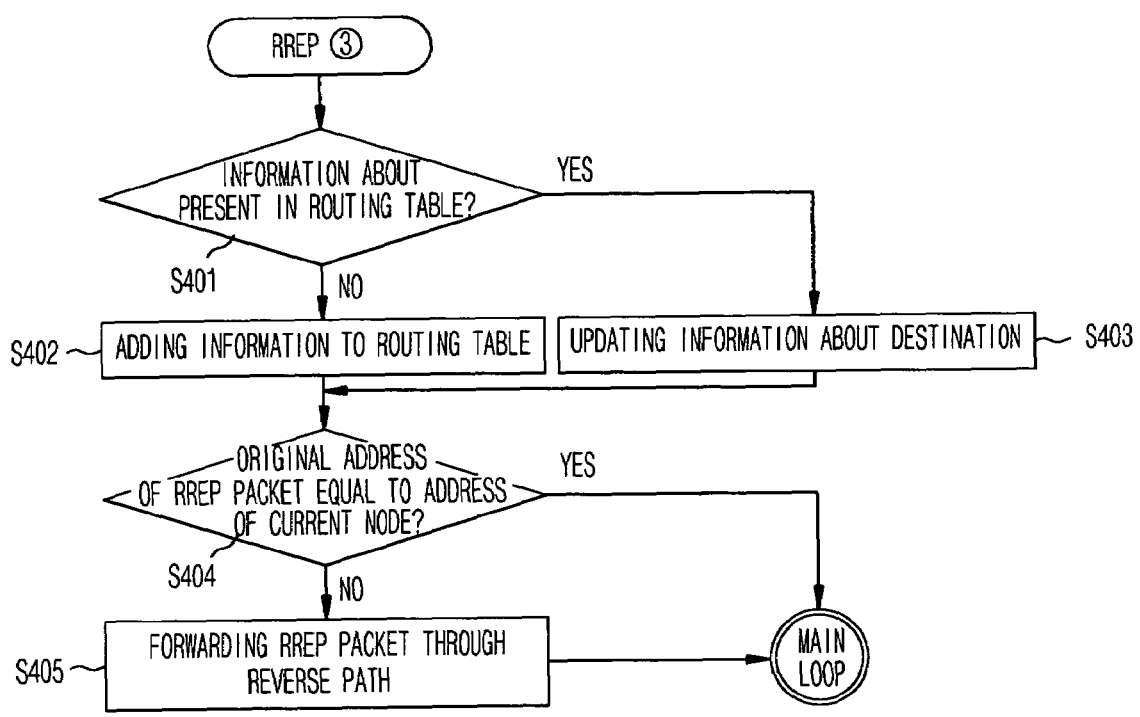
FIG. 4 is a view illustrating an operation of processing an RREP message according to the present invention.

FIG. 4 is a view illustrating an operation of processing the RREP message according to the present invention.

It is checked whether or not information on a destination node is present at the routing table (S401). If so, the destination information is updated (S403), and if not, the information is added to the routing table (S402).

Then, it is checked whether or not an origin address of the RREP packet is the same as the address of the current node (S404).

If it is checked that the origin address of the RREP packet is the same as the address of the current node, the RREP forwarding process is ended. If it is checked that the origin address of the RREP packet is not the same as the address of the current node, the RREP packet is forwarded through the reverse path (S405).

Figure 5:
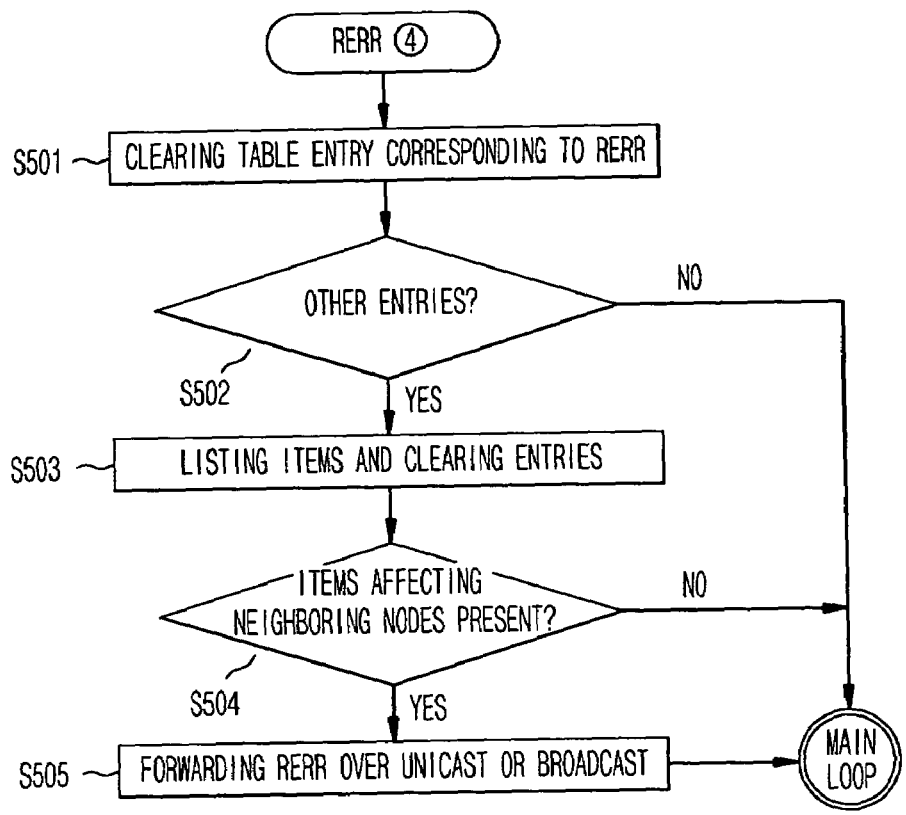
FIG. 5 is a view illustrating an operation of processing an RERR message according to the present invention.

FIG. 5 is a view illustrating an operation of processing the RERR message according to the present invention.

A routing table entry is searched to clear an entry corresponding to the RERR (S501). The sensor network arranges the routing table of its node to confirm whether or not there are other entries, which are affected by the RERR, than the routing table entry (S502).

If it is checked that there are not other entries, the algorithm returns to a main loop. If it is checked that there are other entries, items are listed and all entries are cleared from the table.

Then, it is checked with reference to a list of FIG. 3 whether or not there are items affecting to the neighbor nodes (S504). If it is checked that there are not the items, the algorithm returns to the main loop. If it is checked that there are the items, the RERR is forwarded to all neighbors included in the list in a unicast or broadcast mode (S505).

Figure 6:
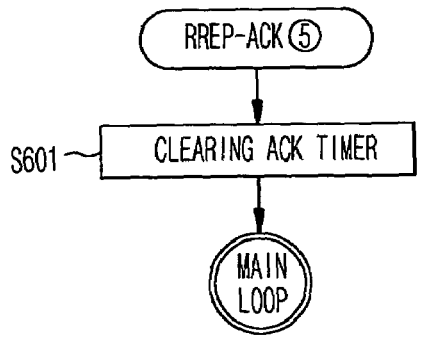
FIG. 6 is a view illustrating an operation of processing an RREP_ACK message according to the present invention.

FIG. 6 is a view illustrating an operation of processing the RREP_ACK message according to the present invention.

A timer driven by forwarding through a specific option of the RREP is stopped, and the algorithm returns to the main loop (S601).

The inventive algorithm uses a simulation software as a network simulator to compare and analyze performances of Ad Hoc On-Demand Distance Vector (AODV) routing, Destination-Sequenced Distance Vector (DSDV) routing, Dynamic Source Routing (DSR) algorithms. As an object of the performance analysis, there are an average energy amount and distribution of the node depending on time, and the number of dead nodes.

The average energy amount means a remaining energy amount of the nodes during a simulation time, and the distribution means the energy distribution between the nodes. Since a main object of the inventive algorithm is to extend the lifetime of the network by equally distributing the energy amount between the nodes, a better performance is obtained with the distribution getting closer to '0'. Further, as the dead nodes are decreased in number, the object of the inventive algorithm is better accomplished.

As a simulation result, it can be understood that the distribution value of the inventive algorithm is lower than those of other routing algorithms (AODV, DSDV and DSR). This means that the remaining energy amount between the nodes is similarly distributed, and means that any specific node has a remarkably less probability of first dying in comparison with other nodes. Accordingly, the lifetime of the network is extended in comparison with other routing algorithms.

Further, as the result of comparing the inventive algorithm with other routing algorithms by using the number of the dead nodes, the dead nodes of the inventive algorithm are decreased in number, and have a remarkable difference from that of the AODV being a modification target.

As described above, the present invention has an effect in that as a result of analyzing the average energy and the distribution of the node and the number of the dead node, the remaining energy amount of each node is similarly maintained to extend the lifetime of the network to the maximum by equally distributing data transmitting with reference to the energy of the node.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of providing a routing protocol in a sensor network, the method comprising the steps of:
   (a1) initializing a routing table;
   (a2) searching a network device of a node to initialize a host;
   (b) opening a packet socket when there is a request for forwarding of an IP (Internet Protocol) packet from an upper layer node or when there is a request from the network device;
   (c) determining whether the request is received from the upper layer node or the IP packet is received from the network device;
   (d) if the request is received from the upper layer node, searching the routing table to determine whether or not there is a destination node which intends to transmit the IP packet, and returning to the step (c) if there is the destination node; and
   (e) if the IP packet is received from the network device, determining a type of the received IP packet and performing an RREQ (route request) process, an IDLE process, an RREP (route reply) process, an RERR (route error) process, and an RREP_ACK (route reply acknowledgement) process, wherein the step (e) includes steps of:
- (f) if the received IP packet is RREQ, extracting an energy field value of an RREQ message and determining whether the energy field value is '0' or not;
- (g) if the energy field value is '0', setting the RREO packet to '10' in an amount of energy, and if the energy field value is not '0', checking whether a current node has processed the RREO;
- (h) if the current node has never processed the RREQ, measuring an amount of energy at the current node and comparing the measured amount of energy with a first threshold value;
- (i) if the amount of energy at the current node is smaller than the first threshold value, determining whether or not a difference between the energy of the current node and the energy field value of the received RREQ packet is larger than a second threshold value, and if smaller, setting the energy field value of the RREQ packet to '10', and if larger, setting the energy field to an IDLE message; and
- (j) if the amount of energy at the node is larger than the second threshold value, forwarding the RREQ packet to next node in the same manner as a general RREQ packet forwarding.

2. The method of claim 1, wherein in the step (d), if the routing table does not indicate the destination node, an RREQ packet is forwarded after setting a corresponding energy field.

3. The method of claim 1, wherein the step (j) includes the steps of:
storing a reverse path for forwarding the RREQ packet and determining whether information about a destination node of the packet is present at a current node; and
if there is the information about the destination node, updating the routing table and forwarding the RREP message using the reverse path.

4. The method of claim 1, wherein the step (e) further includes the steps of:
if the received packet is an IDLE, determining whether or not an original address of the received message is equal to an address of a local node receiving the IDLE packet;
if the original address is not equal to the local node, determining whether or not the number of nodes whose hop count of the routing table is '1' is equal to two;
if not equal, increasing an IDLE count value by one;
comparing the number of nodes having hop count '1' with the IDLE count value; and
if the number of the nodes having the hop count of '1' is equal to the IDLE count value, setting an energy to '0'; and
setting a field value of the RREQ message.

5. The method of claim 1, wherein the step (e) further includes the steps of:
if the received packet is RREP, determining whether information about the destination is present at the routing table;
if the information is present, updating information of the routing table, and if the information is not present, adding the information to the routing table;
checking whether an original address of the RRFP packet is equal to that of a current node; and
if the original address of the RREP packet is equal to that of the current node, ending the RREP forwarding process, and if not, forwarding the RREP packet through a reverse path.

6. The method of claim 1, wherein the step (e) further includes the steps of:
if the received packet is RERR, searching a routing table and clearing an entry corresponding to the RERR;
checking whether or not there is other entry affected by the RERR;
if there are other entries affected by the RERR, making a list of items and clearing the entries; and
checking whether or not there are items affecting neighboring nodes;
if there are the items affecting the neighboring nodes, forwarding the RERR to all neighbors included in the list over unicast or broadcast.

7. The method of claim 1, wherein the step (e) includes the step of: if the received packet is RREP_ACK, stopping a timer driven by forwarding through a specific option of the RREP and returning to the step (c).

* * * * *